Patented Apr. 27, 1926.

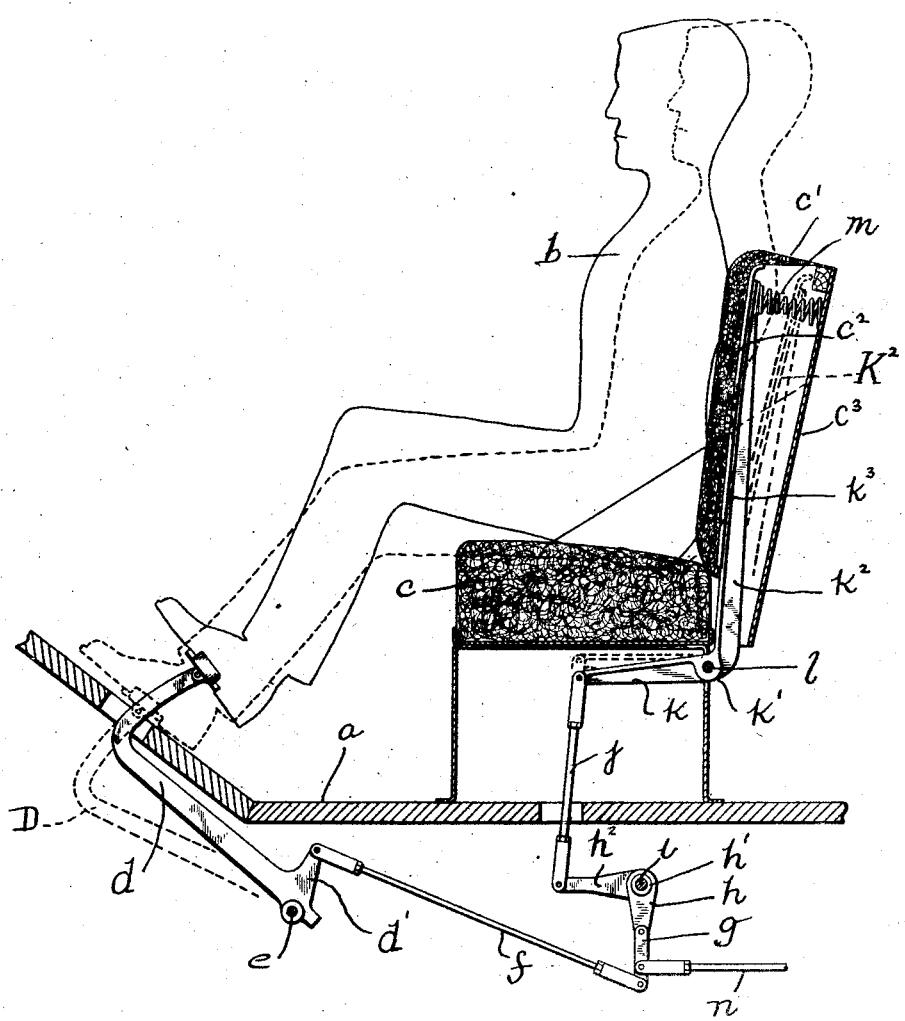

1,582,879

UNITED STATES PATENT OFFICE.

GABRIEL MIDBOE, OF BROOKLYN, NEW YORK, ASSIGNOR TO INTERNATIONAL MOTOR COMPANY, OF NEW YORK, N. Y., A CORPORATION OF DELAWARE.

BRAKE MECHANISM.

Application filed December 18, 1924. Serial No. 756,631.

*To all whom it may concern:*

Be it known that I, GABRIEL MIDBOE, a citizen of the United States, residing in the borough of Brooklyn, of the city of New York, in the State of New York, have invented certain new and useful Improvements in Brake Mechanism, of which the following is a specification, reference being had to the accompanying drawing, forming a part hereof.

This invention relates to brake actuating devices for vehicles. Ordinarily the application of braking power in a vehicle is initiated by the operator through a foot pedal or its mechanical equivalent, a hand lever. The present invention has to do with supplementing the application of braking power by the operator through a foot pedal. When the driver applies the brakes he does so by applying a certain amount of pressure to the brake pedal. To do this, however, the driver's back must be braced. Thus the pressure which is exerted against the back rest which is of the same amount and in the opposite direction is taken up by the back of the seat. With the conventional rigid seat this force is wasted as it is thrown into or dissipated in the floor of the vehicle. It is an object of the present invention to utilize the force hitherto dissipated and add it to the brake pressure already obtained through the foot pedal. To this end the back rest for the driver's seat is movable and is connected with the brake actuating mechanism by a series of levers so that the pressure applied against the back by the operator when operating the brake pedal is utilized in the application of additional braking power. In the preferred embodiment a bell crank lever is pivoted below the rear edge of the seat with one arm extending upwardly within the seat back, the other lever arm being connected through a series of links and levers with the brake actuating mechanism. When the driver of the vehicle attempts to apply brake pressure by forcing down the brake pedal with his foot and braces his back against the back rest for this purpose the straightening of the toggle joint formed by the knee causes not only the foot pedal to be depressed but the back rest to be forced rearwardly against the arm of the bell crank lever. If desired, suitable devices may be provided such as a coil spring or other resilient means to return the arm of the lever to forward position when the pressure is removed. The invention will now be described more particularly with reference to the accompanying drawing illustrating a preferred embodiment thereof and showing a driver's seat and brake pedal connected in usual manner to a brake rod, the back rest being movable according to the present invention and connected by a series of links and levers to the brake actuating mechanism.

In the drawing the floor of the vehicle is indicated at $a$ and the seat for the operator $b$ is indicated at $c$. A foot pedal $d$ of any conventional type is adapted to extend through an aperture in the floor of the vehicle and is pivoted at its lowermost end about the shaft $e$. An arm $d'$ of the brake pedal is connected through a link $f$ with a link $g$ pivotally connected to an arm $h$ rigidly carried with a sleeve $h'$ rotatable upon the shaft $i$. Also carried with the sleeve $h'$ is an arm $h^2$ extending at an angle to the direction of the arm $h$ and forming therewith what is in effect a bell crank lever. The outer end of the arm $h^2$ is connected through a link $j$ with the extremity of the arm $k$ of a bell crank lever $k'$ pivoted as at $l$ below and near the rear edge of the seat $c$. The other arm $k^2$ of the bell crank is extensive in length and extends upwardly within the back of the seat $c'$ between the cushion $c^2$ and the rigid back $c^3$. The front face $k^3$ of the lever is of substantial breadth. Normally the arm $k^2$ is pressed forwardly against cushion $c^2$ by means of a coil spring $m$ bearing against the rigid back $c^3$.

The operation of the device will be apparent from the foregoing description taken in connection with the accompanying drawings. When the driver applies his brakes he does so by exerting a certain amount of pressure to the brake pedal, say one hundred pounds. The lever is thus depressed to the position indicated at D in dotted lines. To exert this pressure his back must be braced. The pressure which he exerts is also approximately one hundred pounds in the opposite direction and is taken by the back of the seat which force is normally dissipated in the floor of the vehicle. By permitting the back of the seat to have a certain degree of movement advantage may be taken thereof to apply additional braking pressure. When the driver applies one hundred pounds pressure to the foot pedal which is transmitted to the brake mechanism through the brake rod $n$ connected to the link $g$, he also applies say one hundred pounds pressure against the arm $k^2$ of bell crank lever $k'$ and moves that arm to the position in dotted lines at $k^2$ and this one hundred pounds pressure is also transmitted through the linkage shown to the brake rod $n$ and the application of the two pressures is cumulative and results in the application of say two hundred pounds pressure to the brake mechanism through the brake rod $n$. The normal movements of the operator in driving the vehicle will be taken up in the yielding cushion $c^2$ and are not sufficient to cause the application of braking power.

It will thus be seen that brake actuating mechanism is provided in which double the brake power ordinarily obtained is had with the same expenditure of effort on the part of the driver.

Various modifications may be made in the form taken by the devices to take off the forces applied by the operator's back and to apply them to the brake actuating mechanism and no limitation is intended except as indicated by the appended claims.

What I claim is:

1. In a vehicle, the combination with a seat and brake actuating mechanism, of a movable back rest, a foot pedal, and operable connections between the brake mechanism and the back rest and foot pedal whereby simultaneous movement of the back rest and foot pedal actuates the brake mechanism.

2. In a vehicle, in combination with a seat and brake actuating mechanism, a movable back rest, means operable upon movement of the back rest to actuate the brake actuating mechanism, and means to return the back to normal position.

3. In a vehicle, in combination with a seat and brake actuating mechanism, means to actuate the brake mechanism by the foot of the seat occupant, a movable back rest, and means operable upon movement of the back rest to actuate the brake actuating mechanism.

4. In a vehicle in combination with the seat and brake actuating mechanism, of a movable back rest, a bell crank lever pivoted below the seat, one arm of said lever extending upwardly within the back rest and the other arm of said lever operatively connected with the brake actuating mechanism.

5. In a vehicle, in combination with the seat and brake actuating mechanism, a foot pedal to actuate the brake mechanism, of a movable back rest, a bell crank lever pivoted below the seat, one arm of said lever extending upwardly within the back rest and the other arm of said lever operatively connected with the brake actuating mechanism.

6. In a vehicle, in combination with the seat, brake actuating mechanism and a foot pedal to actuate the brake mechanism, of a movable back rest, a bell crank lever pivoted below the seat, one arm of said lever extending upwardly within the back rest and the other arm of said lever operatively connected with the brake actuating mechanism, and a spring to return the lever arm to normal position.

7. In a vehicle, the combination with a seat and brake actuating mechanism, of a movable back rest, a foot pedal, and operable connections between the brake mechanism and the back rest and foot pedal whereby simultaneous movement of the back rest and foot pedal in opposite directions actuates the brake mechanism.

This specification signed this 16th day of Dec. A. D. 1924.

GABRIEL MIDBOE.